(12) United States Patent
Zaccagnini

(10) Patent No.: US 6,832,774 B1
(45) Date of Patent: Dec. 21, 2004

(54) VEHICLE CONVERTIBLE BETWEEN A BICYCLE AND A SCOOTER

(76) Inventor: Eric R. Zaccagnini, 5 Hutchinson Ct., Lynn, MA (US) 01902

(*) Notice: Subject to any disclaimer, the term of this patent is extended or adjusted under 35 U.S.C. 154(b) by 0 days.

(21) Appl. No.: 10/293,670

(22) Filed: Nov. 13, 2002

(51) Int. Cl.[7] ................................................. B62K 1/00
(52) U.S. Cl. ...................... 280/274; 280/278; 280/87.04
(58) Field of Search ................................ 280/274, 278, 280/281.1, 287, 87.041, 87.05, 259, 7.1, 7.17

(56) References Cited

U.S. PATENT DOCUMENTS

| | | | | |
|---|---|---|---|---|
| 1,658,068 A | * | 2/1928 | White | 280/87.041 |
| 1,965,194 A | | 7/1934 | Koch | |
| 2,183,534 A | | 12/1939 | Bernier | |
| 2,468,933 A | | 5/1949 | Jones | |
| 2,660,442 A | | 11/1953 | Wiesner et al. | |
| 3,006,659 A | | 10/1961 | Krasnoff et al. | |
| 3,337,240 A | | 8/1967 | Rizzato | |
| 4,653,766 A | | 3/1987 | Guandalini | |
| 4,761,014 A | * | 8/1988 | Huang | 280/258 |
| 4,763,913 A | | 8/1988 | Ehrlich | |
| 4,824,130 A | * | 4/1989 | Chiu | 280/239 |
| 5,290,053 A | * | 3/1994 | Barts et al. | 280/281.1 |
| 5,785,338 A | * | 7/1998 | Chang | 280/278 |
| 5,927,733 A | * | 7/1999 | Banda | 280/87.041 |
| 6,206,387 B1 | * | 3/2001 | Tsai | 280/87.041 |
| 6,505,845 B1 | * | 1/2003 | Fong | 280/228 |

FOREIGN PATENT DOCUMENTS

| | | |
|---|---|---|
| DE | 3244466 | 6/1984 |
| DE | 3936317 | 5/1991 |

* cited by examiner

Primary Examiner—Daniel G. DePumpo
(74) Attorney, Agent, or Firm—Kriegsman & Kriegsman

(57) ABSTRACT

A vehicle convertible between a bicycle and a scooter includes a frame constructed of a rigid material. The frame comprises a laterally extending post, a pair of spaced apart support tubes formed onto the post, and a footboard fixedly mounted onto the support tubes. Each support tube includes a first section which extends down and forward from the post at an angle of approximately 20 degrees and a second section which extends horizontally forward from the first section. A front fork is mounted onto the frame and supports a handlebar assembly. A front wheel is rotatably mounted onto the front fork and a rear wheel is rotatably mounted onto the frame, each wheel being approximately 12 inches in diameter. A seat assembly is mounted onto the frame and is capable of being pivotally displaced. A pedal assembly is mounted onto the post and serves to rotatably drive the rear wheel.

14 Claims, 4 Drawing Sheets

VEHICLE CONVERTIBLE BETWEEN A BICYCLE AND A SCOOTER

BACKGROUND OF THE INVENTION

The present invention relates generally to two-wheel vehicles and more particularly to two-wheel vehicles which can be converted between a bicycle and a scooter.

Two-wheel vehicles are well known in the art and are commonly used in a variety of different applications. For instance, a two-wheel vehicle may be used as a mode of transportation which can be used to travel through spaces of limited size (e.g., a sidewalk). As another example, a two-wheel vehicle may be used as a mode of entertainment which can be used to perform stunts or tricks (e.g., jumps or spins), this type of usage being commonly referred to as freestyle riding in the art.

A bicycle is one type of two-wheel vehicle which is well known in the art. A bicycle typically comprises front and rear wheels which are rotatably mounted onto a rigid frame of steel tubing. A pair of handlebars are fixedly coupled to the front wheel to enable the operator to steer the bicycle. A seat is mounted onto the frame to support the operator in a seated position when riding the bicycle. A pedal assembly is fixedly coupled to the rear wheel and includes a pair of foot pedals which enable the operator to manually propel the bicycle forward.

In use, a bicycle is typically operated in the following manner. The operator sits on the seat and grasps the handlebars with his/her hands. The operator then places each foot on an associated foot pedal, thereby displacing the entire weight of the operator onto the bicycle. Rotating, or cycling, the feet of the operator in a circular motion, in turn, causes the pedal assembly to rotate. The rotation of the pedal assembly transmits a rotational force onto the rear wheel which, in turn, propels the device forward. With the device advancing forward, the user can turn the handlebars, as desired, to steer the bicycle in a particular direction. If necessary, the bicycle can be abruptly stopped through the application of manual brakes which are located on the front wheel and/or the rear wheel.

A scooter is another type of two-wheel vehicle which is well known in the art. A scooter typically comprises front and rear wheels which are rotatably mounted onto opposite ends of a low, narrow footboard. A pair of handlebars are fixedly coupled to the front wheel to enable the operator to steer the scooter.

In use, a scooter is typically operated in the following manner. While in a standing position, the user grasps the handlebars to stabilize the device. The user then places one foot onto the footboard so that the scooter supports the weight of the operator. With the weight of the operator still on the scooter, the free foot of the operator is used to repeatedly push off against the ground in order to drive the scooter forward. If necessary, the scooter can be abruptly stopped either by dragging the free foot of the user against the ground or by applying brakes located on the front wheel and/or the rear wheel.

It has been found that many consumers own two or more different types of two-wheel vehicles. For example, young children often own both a bicycle and a scooter. However, it should be noted that the purchase of multiple different vehicles can be very costly to the consumer, which is highly undesirable.

Accordingly, two-wheel vehicles which can be converted between a bicycle and a scooter are well-known in the art.

As an example, in U.S. Pat. No. 4,763,913 to W. Ehrlich there is disclosed a bicycle/scooter combination that has a support tube assembly including two lower support tubes each having a front terminus affixed to the head tube; a downwardly extending front portion; a rearwardly extending horizontal portion; and an upwardly extending rear portion including a rear terminus of the lower support tubes. The rear terminus is affixed to the bracket shell. There is further provided an upper support tub having an upper terminus affixed to the head tube and a lower terminus attached to the rearwardly extending horizontal portion of the lower support tubes; a horizontal platform supported by the rearwardly extending horizontal portions of the lower support tubes; and chain stays each having a front end affixed to the upwardly extending rear portions of the lower support tubes and a rear end carrying a rear-wheel supporting plate.

Conventional bicycle/scooter combinations of the type described above suffer from a number of significant drawbacks.

As a first drawback, with the conventional bicycle/scooter configured for use as a scooter, particular components which are required only during use of the vehicle as a bicycle (e.g., the pedal assembly and the seat assembly) are often situated in close proximity to the footboard of the scooter. As a result, the operator (and in particular, a child operator) is susceptible to inadvertently contacting said components during use of the device as a scooter, which can be very dangerous.

As a second drawback, conventional bicycle/scooter combinations typically comprise front and rear tires which are relatively large in size (e.g., 2 or 3 feet in diameter). As a result, the operator (and in particular, a child operator) would have a more difficult time controlling the vehicle when used as either a bicycle or a scooter.

As a third drawback, conventional bicycle/scooter combinations are typically large in overall size and are incapable of being adequately compacted. As a result, the vehicle is often too large in size to be confined to a storage area of limited size.

SUMMARY OF THE INVENTION

It is an object of the present invention to provide a new and improved two-wheel vehicle.

It is another object of the present invention to provide a new and improved two-wheel vehicle which is convertible between a bicycle and a scooter.

It is yet another object of the present invention to provide a vehicle as described above which is designed for use by children.

It is still another object of the present invention to provide a vehicle as described above which is easy to operate.

It is yet still another object of the present invention to provide a vehicle as described above which can be easily compacted for storage.

Accordingly, as a feature of the present invention, there is provided a vehicle convertible between a bicycle and a scooter, said vehicle comprising a frame which includes a laterally extending post having a first end, a second end and a curved outer surface, a first pair of spaced apart support tubes formed onto the curved outer surface of said laterally extending post, each of said first pair of support tubes comprising, a first section which extends down and forward from the curved outer surface of said laterally extending post, and a second section which extends horizontally forward from the first section, and a footboard fixedly mounted onto the second section of said first pair of spaced apart support tubes, a front fork rotatably mounted onto said frame, a handlebar assembly mounted onto said front fork, a front wheel rotatably mounted onto said front fork, a rear wheel rotatably mounted onto said frame, a seat assembly mounted onto said frame, and a pedal assembly for rotatably driving said rear wheel.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 3 is an enlarged, side perspective view of the front fork of the vehicle shown in FIG. 1;

DETAILED DESCRIPTION OF THE PREFERRED EMBODIMENT

Figure 1:
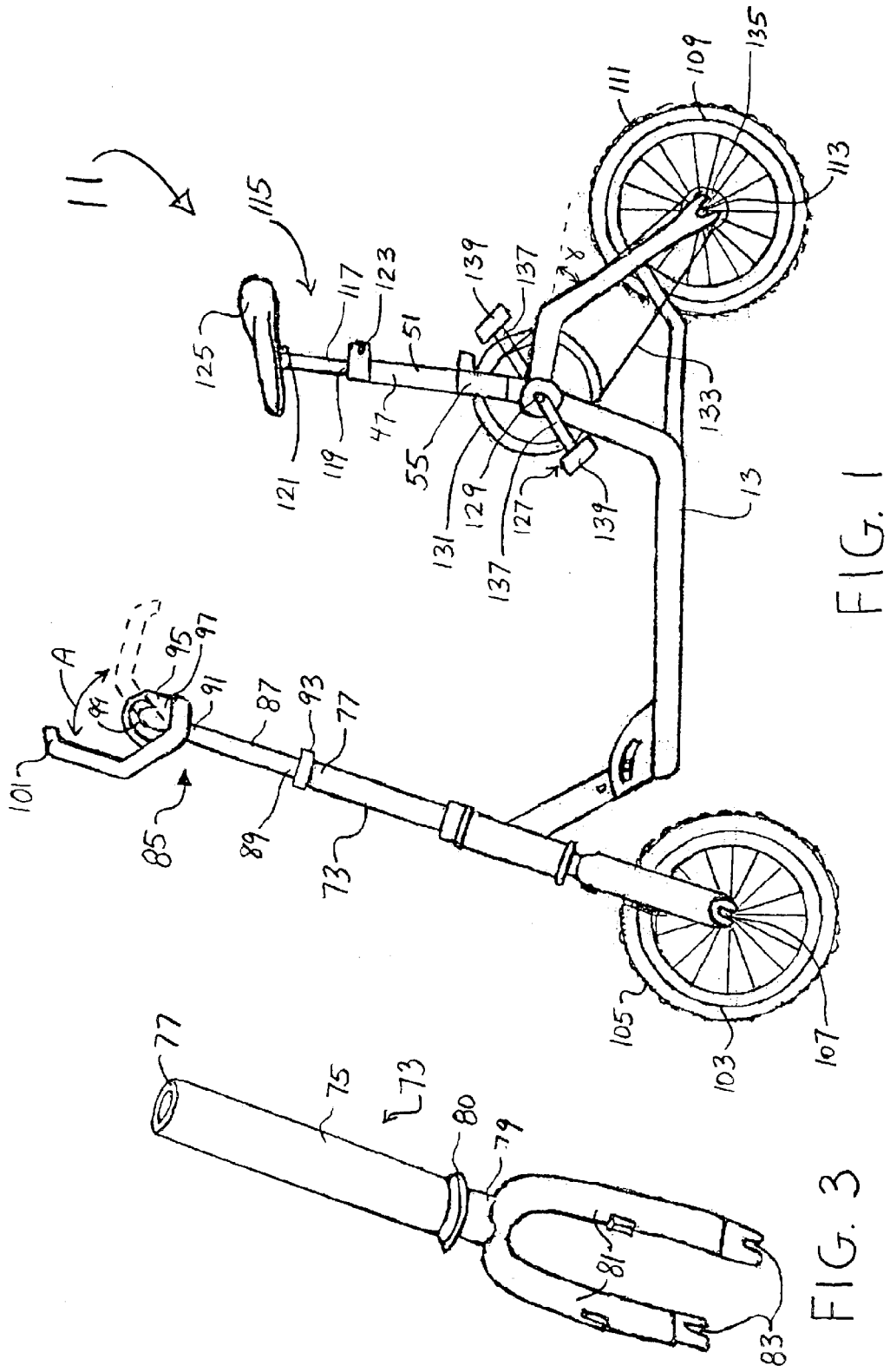
FIG. 1 is a side plan view of the vehicle constructed according to the teachings of the present invention, wherein there is shown in dashed lines a second position to which the handlebars can be pivoted.

Referring now to FIG. 1, there is shown a side plan view of a two-wheel vehicle constructed according to the teachings of the present invention and identified generally by reference numeral 11. As will be described further in detail below, two-wheel vehicle 11 is designed principally for the use of a child operator and can be readily converted into either a bicycle or a scooter.

Figure 2:
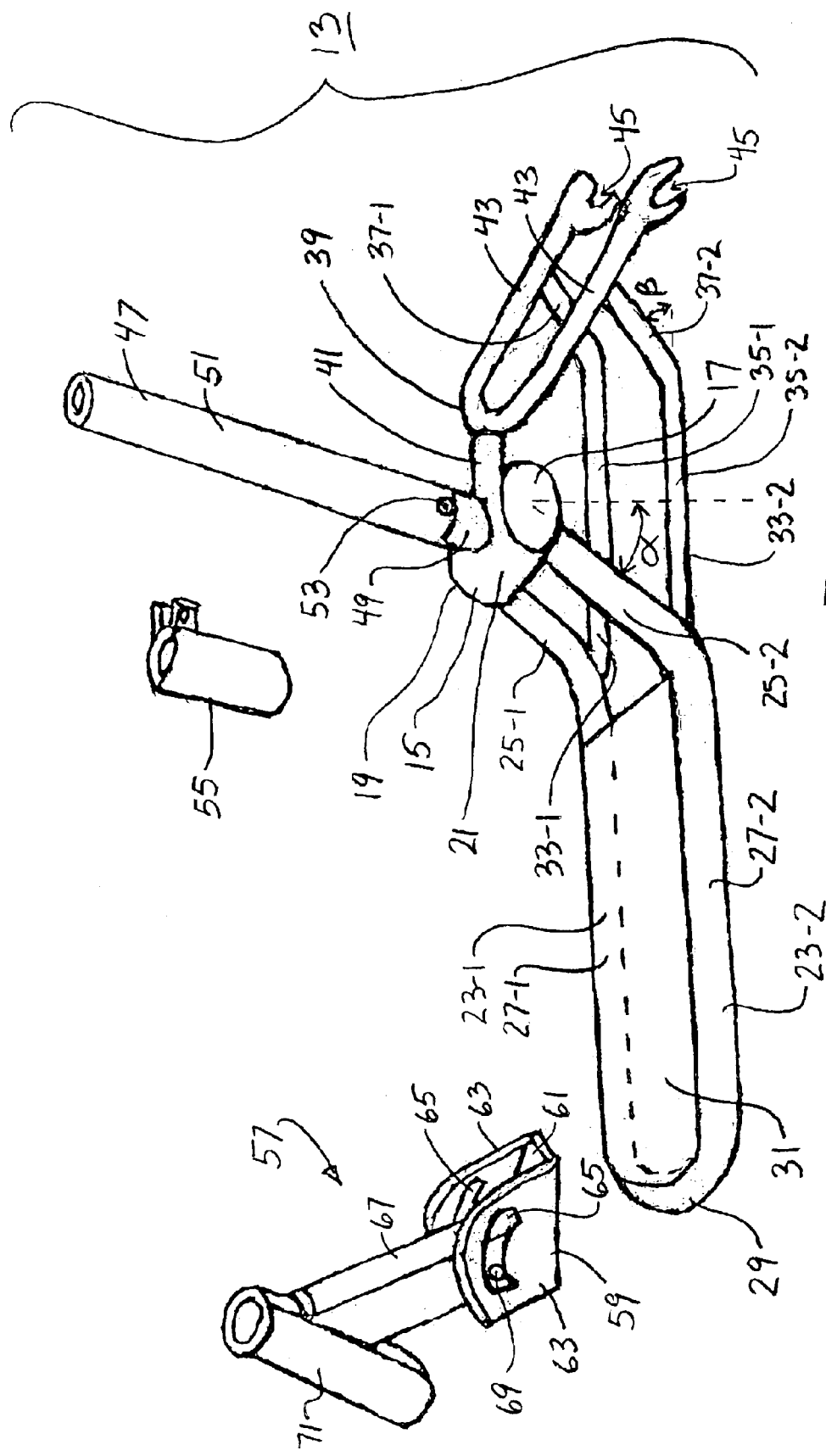
FIG. 2 is an exploded, side perspective view of the frame of the vehicle shown in FIG. 1.

Vehicle 11 comprises a frame 13 which is constructed of a rigid and durable material, such as steel or aluminum. As seen most clearly in FIG. 2, frame 13 comprises an enlarged, laterally extending cylindrical post 15 having a vertical axis Av, a first end 17, a second end 19 and a curved outer surface 21.

A first pair of spaced apart support tubes 23-1 and 23-2 are integrally formed onto the underside of curved outer surface 21. Each support tube 23 comprises a first section 25 which is approximately 6 inches in length and which extends down and forward from post 15 at an angle a of approximately 20 degrees. Each support tube 23 additionally comprises a second section 27 which is integrally formed onto the free end of its associated first section 25. Second section 27 of each support tube 23 is approximately 16 inches in length and is disposed to extend horizontally forward. The front ends of second sections 27 of support tubes 23 are integrally formed together so as to create a curved front end 29.

A footboard 31 is fixedly mounted on top of the second section 27 of support tubes 23 by any conventional means (e.g., bolting, welding, etc.). Footboard 31 is substantially flat and serves as a platform for supporting the weight of the operator when vehicle 11 is utilized as a scooter, as will be described further below.

A second pair of spaced apart support tubes 33-1 and 33-2 are integrally formed onto first pair of support tubes 23-1 and 23-2, respectively. Each support tube 33 comprises a first section 35 which extends horizontally rearward from an associated second section 27 of support tubes 23. Each support tube 33 additionally comprises a second section 37 which is integrally formed onto the free end of its associated first section 35. Second end 37 of each support tube 33 is disposed to extend upwardly are rearwardly from the free end of its associated first section 35 at an angle β of approximately 60 degrees relative to its associated first section 35.

A rear fork 39 is integrally formed onto the rear of curved outer surface 21 and onto the free ends of second end 37 of support tubes 33. Rear fork 39 comprises a cylindrical shank 41 which is integrally formed onto the rear of curved outer surface 21 of post 15. Shank 41 is disposed to extend horizontally rearward from post 15. A pair of spaced apart arms 43 extend out from the free end of shank 41. Arms 43 are disposed to extend rearwardly and downwardly from shank 41 at an angle γ of approximately 50 degrees. The free ends of second sections 37 of support tubes 33 are connected onto the approximate midpoints of arms 43, thereby providing frame 13 with considerable structural strength, which is highly desirable. The free end of each arm 43 is shaped to define a slot 45 for receiving the rear wheel, as will be described further below.

A hollowed support tube 47 is integrally formed onto the topside of curved outer surface 21. Tube 47 is approximately 9 inches in length and extends straight up from post 15. Tube 47 comprises a fixed section 49 and a movable section 51. As will be described further in detail below, movable section 51 is capable of being pivoted relative to fixed section 49 about a pivot point 53. In this capacity, a seat assembly mounted onto support tube 47 could be pivoted forwards or backwards in order to reduce the size of vehicle 11.

A slide lock 55 is telescopingly disposed over hollowed support tube 47. Slide lock 55 is in the form of a conventional lockable collar. Specifically, slide lock 55 is in the form of an elongated cylindrical collar having a longitudinal slot. In use, the diameter of slide lock 55 can be adjusted by tightening or loosening a screw which threadingly engages the collar on opposite sides of the longitudinal slot. As can be appreciated, slide lock 55 serves to releasably lock the position of movable section 51 relative to fixed section 49.

A front bearing 57 is fixedly mounted onto footboard 31 proximate curved front end 29. Bearing 57 comprises a bracket 59 which is fixedly mounted onto footboard by any conventional means, such as welding. Bracket 59 is generally U-shaped in lateral cross-section and includes a base 61 and a pair of spaced apart sidewalls 63 which upwardly extend from base 61, each sidewall 63 being shaped to define an arcuate slot 65.

A support arm 67 is pivotally mounted onto bracket 59, support arm 67 having a length of approximately 9 inches. A pin 69 extends laterally through support arm 67 and projects into the arcuate slot 65 formed in each sidewall 63. As such, the abutment of pin 69 against sidewalls 63 at each end of arcuate slot 65 serves to limit the range of pivotal movement of support arm 67. It should be noted that a nut (not shown) can be tightened onto pin 69 in order to lockably secure the pivotal position of support arm 67 relative to bracket 59.

A hollowed support tube 71 is fixedly mounted onto the free end of support arm 67. Support tube 71 has a length of approximately 4 inches and serves to receive a front fork 73, as will be described further below.

As seen most clearly in FIG. 3, front fork 73 comprises an elongated hollowed shank 75 which comprises an open first end 77 and a second end 79. An outwardly extending flange 80 is integrally formed onto shank 75 proximate second end 79. A pair of spaced apart arms 81 extend out from second end 79 of front fork 73. The free end of each arm 81 is shaped to define a slot 83 for receiving the front wheel, as will be described further below.

As seen most clearly in FIG. 1, a handlebar assembly 85 is telescopingly mounted within open first end 77 of shank 75. Handlebar assembly 85 is conventional in construction and comprises a handlebar shank 87 which is sized and shaped to telescopingly slide within shank 75 of front fork 73. As such, handlebar shank 87 is capable of vertical displacement relative to front fork 73, thereby enabling the operator to raise or lower handlebar assembly 85 as desired.

Handlebar shank 87 is in the form on an elongated tubular member and includes a first end 89 and a second end 91. A conventional lock collar 93 is slidably mounted onto handlebar shank 87 and can be tightened to secure the relative location of handlebar shank 87 relative to front fork 73.

A handlebar bracket 95 is generally U-shaped in lateral cross-section and includes a base (not shown) and a pair of spaced apart sidewalls 97 which upwardly extend from the base, each sidewall 97 being shaped to define an arcuate slot 99.

A pair of conventional handlebars 101 are pivotally mounted onto handlebar bracket 95, thereby enabling handlebars 101 to be pivotally adjusted between multiple positions, as represented by arrow A in FIG. 1. A pin (not shown) extends laterally between handlebars 101 and projects into the arcuate slot 99 formed in each sidewall 97. As such, the abutment of the pin against sidewalls 97 at each end of arcuate slot 99 serves to limit the range of pivotal movement of handlebars 101. It should be noted that a locking device (not shown) can be tightened onto the pin in order to lockably secure the pivotal position of handlebars 101 relative to handlebar bracket 95.

A front wheel 103 is rotatably mounted onto front fork 73. Specifically, front wheel 103 includes a tire 105 which is rotatably mounted onto an axle 107 which, in turn, is disposed within slots 83 of front fork 73. Axle 107 is fixedly secured onto front fork 73 using nuts (not shown).

Similarly, a rear wheel 109 is rotatably mounted onto rear fork 39. Specifically, rear wheel 109 includes a tire 111 which is rotatably mounted onto an axle 113 which, in turn, is disposed within slots 45 of rear fork 39. Axle 113 is fixedly secured onto rear fork 39 using nuts (not shown).

Each of front and rear wheels 103 and 109 is preferably in the form of a conventional 12" wheel which includes a tire tread designed principally for a mountain-type terrain. As can be appreciated, the relatively small size as well as the particular tread of each wheel 103 and 109 renders vehicle 11 considerably easy to control by a child operator, which is highly desirable.

A seat assembly 115 is telescopingly mounted within movable section 51 of seat support tube 47. Seat assembly 115 is conventional in construction and comprises a tubular seat support post 117 which is sized and shaped to telescopingly slide within hollowed support tube 47 of frame 13. As such, seat assembly 115 is capable of vertical displacement relative to frame 13, thereby enabling the operator to raise or lower seat assembly as desired.

Support post 117 is in the form of an elongated cylindrical post which is approximately 4 inches in length. Support post 117 comprises a first end 119 and a second end 121. First end 119 is inserted into the open free end of movable section 51 of support tube 47. A conventional lock collar 123 is slidably mounted onto support tube 47 and can be tightened to secure in place the relative location of seat assembly 115 relative to support post 117.

A bicycle seat 125 is mounted onto second end 121 of support post 117. As will be described further below, bicycle seat 125 is adapted to support the operator of vehicle 11 in a seated position.

A pedal assembly 127 is mounted onto frame 13 and serves to drive rear wheel 109. Pedal assembly 127 comprises a pedal assembly axle 129 which is rotatably mounted and extends longitudinally through cylindrical post 15 of frame 13. A sprocket 131 is fixedly mounted onto pedal assembly axle 129. A conventional bicycle chain 133 is coupled to sprocket 131 and a reduced sized sprocket 135 which is fixedly mounted onto rear wheel 109.

A pair of pedal cranks 137 are fixedly mounted onto pedal assembly axle 129 on opposing ends of post 15, each pedal crank 137 being approximately 5 inches in length. A pedal 139 is mounted onto each pedal crank 137.

Accordingly, pedal assembly 127 can be used to propel vehicle 11 in the following manner. The operator places one foot on top of each pedal 139 pushes each pedal 139 in a forward circular path. The forward circular path of pedals 139 drives cranks 137 in a similar forward circular path which, in turn, rotates pedal assembly axle 129 in a forward circular path. The rotation of axle 129 drives sprocket 131 in a forward circular path which, in turn, drives chain 133 forward. The forward driving of chain 133, in turn, drives sprocket 135 in a forward circular path. The rotation of sprocket 135 rotates rear wheel 109 in a forward circular path which, in turn, propels vehicle 11 forward.

It should be noted that vehicle 11 can be provided with any type of conventional front and/or rear brakes, thereby enabling the operator to quickly stop vehicle 11, as desired. As an example, hand-operated brakes may be provided on handlebars 101 which can be operated to brake front wheel 103 and/or rear wheel 109. As another example, foot-operated brakes may be provided on pedal assembly 127 which can be operated to brake rear wheel 109.

It should be noted that vehicle 11 can be reconfigured (i.e., collapsed) to significantly reduce its overall size, thereby rendering vehicle 11 more suitable for storage, which is highly desirable.

Figure 4:
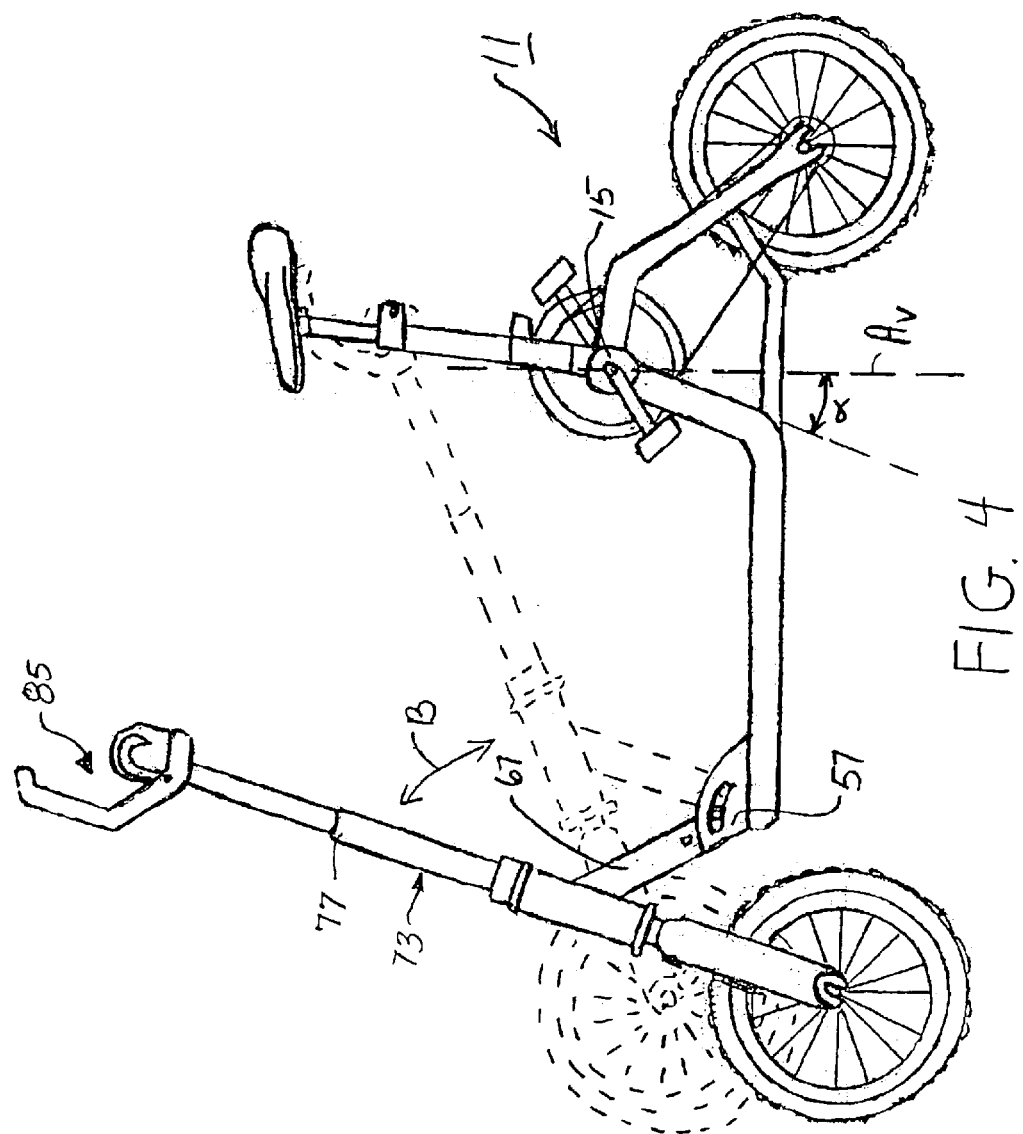
FIG. 4 is a side plan view of the vehicle shown in FIG. 1, wherein there is shown in dashed lines a second position to which the front fork, front wheel, handlebar assembly and a portion of the frame can be pivoted.

As an example, the front end of vehicle 11 can be collapsed inward, thereby reducing the overall size of vehicle 11. Specifically, support arm 67 of front bearing 57 can be pivoted rearward along the path represented by arrow B in FIG. 4. Rearward pivoting of support arm 67, in turn, collapses first end 77 of front fork 73 and handlebar assembly 85 inward (the collapsed inward position of front fork 73 and handlebar assembly 85 being shown in dashed form in FIG. 4).

Figure 5:
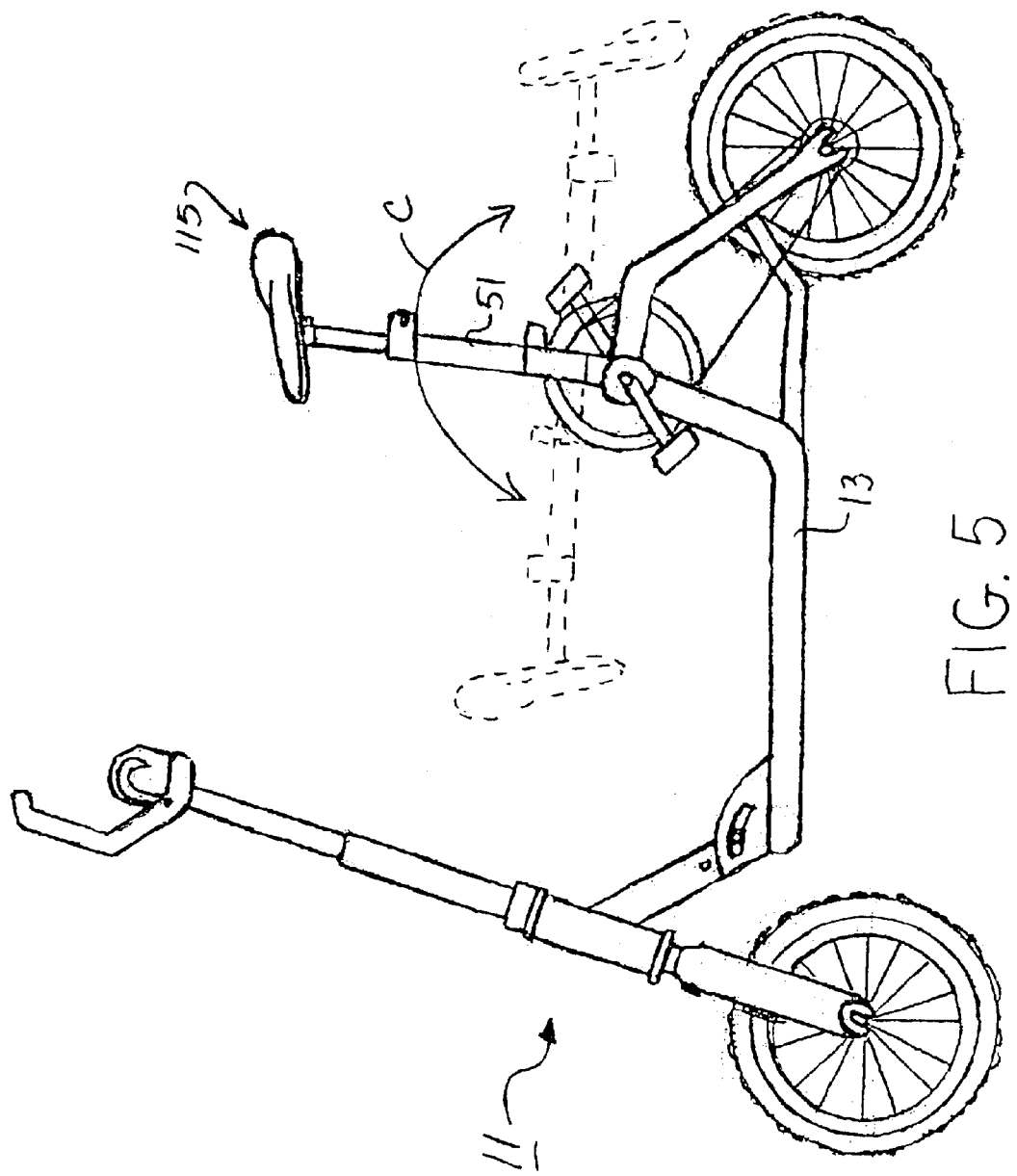
FIG. 5 is a side plan view of the vehicle shown in FIG. 1, wherein there is shown in dashed lines multiple positions to which the seat assembly and a portion of the frame can be pivoted.

As another example, seat assembly 115 can be pivoted forwards or backwards, thereby reducing the overall size of vehicle 11. Specifically, movable section 51 of frame 13 and seat assembly 115 can be pivoted forwards or backwards along the path represented by arrow C in FIG. 5. Pivotal displacement of movable section 51 and seat assembly 115, in turn, reduces the height of vehicle 11 (the collapsed forward and backward positions of movable section 51 and seat assembly 115 being shown in dashed form in FIG. 5).

In use, vehicle 11 can be operated as a bicycle in the following manner. With vehicle 11 configured as shown in FIG. 1, the operator first adjusts the height of seat 125 and/or handlebars 101 as desired. With vehicle 11 configured to the favor of the operator, the operator sits on seat 125 and grasps handlebars 101 with his/her hands. The operator then places one foot on each pedal 139, thereby displacing the entire weight of the operator onto vehicle 11. Rotating, or cycling, the feet of the operator in a circular motion, in turn causes pedals 139 to rotate. The rotation of pedals 139 transmits a rotational force onto rear wheel 109 which, in turn, propels vehicle 11 forward. With vehicle 11 advancing forward, the operator can turn handlebars 101, as desired, to steer vehicle 11 in a particular direction. If required to stop abruptly, the operator can activate front and/or rear brakes on vehicle 11.

Vehicle 11 can also be operated as a scooter in the following manner. With vehicle 11 configured as shown in FIG. 1, the operator first adjusts the height of handlebars 101 as desired. The operator, can additionally, pivot seat assembly 115 rearward, if desired. With vehicle 11 configured to the favor of the operator, the operator, in a standing position, grasps handlebars 101 to stabilize vehicle 11. The operator then places one foot onto footboard 31 so that vehicle 11 supports the weight of the operator. With the weight of the operator still on vehicle 11, the free foot of the operator is used to repeatedly push off against the ground in order to drive vehicle 11 forward. If necessary, vehicle 11 can be abruptly stopped either by dragging the free foot of the operator against the ground or by applying the brakes located on front wheel 103 and/or rear wheel 109.

As noted above, when not in use as either a bicycle or a scooter, vehicle 11 can be collapsed for storage purposes, which is highly desirable. Specifically, support arm 67 of front bearing 57 can be pivoted rearward which, in turn, collapses first end 77 of front fork 73 and handlebar assembly 85 inward, thereby reducing the height of vehicle 11. In addition, movable section 51 of frame 13 and seat assembly 115 can be pivoted forwards or backwards, thereby reducing the height of vehicle 11.

It should be noted that vehicle 11 includes a number of significant features which facilitates use of vehicle 11 by a child operator, which is highly desirable.

As a first feature, pedal assembly 127 is mounted onto frame 13 in such a manner so as not to interfere with a child operator using vehicle 11 as a scooter, which is highly desirable. Specifically, pedal assembly axle 129 is disposed considerably high up on frame 13 (approximately 14.5 inches above the bottom surface of rear wheel 109). In addition, pedal assembly axle 129 is disposed considerably behind footboard 31. Furthermore, the diameter of sprocket 131 and the length of cranks 137 are relatively small in size. As a result of all these factors, pedal assembly 127 is disposed a considerable distance away from footboard 31 so as not to interfere with a child operator using vehicle 11 as a scooter.

As a second feature, front wheel 103 and rear wheel 109 are relatively small in diameter (approximately 12 inches). As a result, the reduced size of wheels 103 and 109 causes frame 13 of vehicle 11 to remain lower to the ground, thereby enabling a small child to more easily utilize vehicle 11. Furthermore, the reduced size of wheels 103 and 109 renders vehicle 11 easier to control when riding, jumping, or performing stunts.

The embodiment shown of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A vehicle convertible between a bicycle and a scooter, said vehicle comprising:
   (a) a frame comprising,
      (i) a laterally extending post having a vertical axis, a first end, a second end and a curved outer surface,
      (ii) a first pair of spaced apart support tubes formed onto the curved outer surface of said laterally extending post, each of said first pair of support tubes comprising,
         (A) a first section which extends down and forward from the curved outer surface of said laterally extending post, and
         (B) a second section which extends horizontally forward from the first section, and
      (iii) a footboard fixedly mounted onto the second section of said first pair of spaced apart support tubes,
      (iv) wherein the first section of each of said first pair of spaced apart support tubes extends down and forward from the curved outer surface of said laterally extending post at an angle of approximately 20 degrees relative to the vertical axis of said laterally extending post,
   (b) a front fork rotatably mounted onto said frame,
   (c) a handlebar assembly mounted onto said front fork,
   (d) a front wheel rotatably mounted onto said front fork,
   (e) a rear wheel rotatably mounted onto said frame,
   (f) a seat assembly mounted onto said frame, and
   (g) a pedal assembly for rotatably driving said rear wheel.

2. The vehicle of claim 1 wherein said frame further comprises a support tube formed onto said laterally extending post, said support tube being adapted to receive said seat assembly.

3. The vehicle of claim 2 wherein said support tube comprises:
   (a) a fixed section fixedly mounted onto the curved outer surface of said laterally extending post, and
   (b) a movable section pivotally mounted onto said fixed section, said movable section being adapted to receive said seat assembly.

4. The vehicle of claim 3 further comprising a slide lock telescopingly mounted over said support tube for releasably locking the position of said movable section relative to said fixed section.

5. The vehicle of claim 1 wherein said frame further comprises a front bearing fixedly mounted onto said footboard, said front bearing being adapted to receive said front fork.

6. The vehicle of claim 5 wherein said front bearing comprises:
   (a) a bracket fixedly mounted onto said footboard,
   (b) a support arm pivotally mounted onto said bracket, and
   (c) a hollowed support tube fixedly mounted onto said support arm, said hollowed support tube being adapted to receive said front fork.

7. The vehicle of claim 6 wherein said bracket is shaped to define at least one arcuate slot.

8. The vehicle of claim 7 further comprising a pin extending laterally through said support arm, said pin projecting into the at least one arcuate slot in said bracket so as to limit the range of pivotal movement of said support arm relative to said bracket.

9. The vehicle of claim 1 wherein said frame further comprises a second pair of spaced apart support tubes formed onto said first pair of support tubes.

10. The vehicle of claim 9 wherein each of said second pair of spaced apart support tubes includes a first section which extends horizontally rearward from an corresponding second section of said first pair of spaced apart support tubes.

11. The vehicle of claim 10 wherein each of said second pair of spaced apart support tubes includes a second section which extends upwardly and rearwardly from a corresponding first section of said second pair of spaced apart support tubes at an angle of approximately 60 degrees relative to its associated first section.

12. The vehicle of claim 11 wherein said frame further comprises a rear fork formed onto said laterally extending post and said second pair of spaced apart support tubes, said rear fork being adapted to receive said rear wheel.

13. The vehicle of claim 1 wherein said pedal assembly comprises:

(a) a pedal assembly axle extending longitudinally through said laterally extending post from the first end to the second end, said pedal assembly axle being capable of rotatable movement relative to said laterally extending post, (b) a pair of pedal cranks fixedly mounted onto said pedal assembly axle, (c) a pair of pedals, one pedal being mounted onto each of said pair of pedal cranks, (d) a first sprocket fixedly mounted onto said pedal assembly axle, (e) a second sprocket fixedly mounted onto said rear wheel, and (f) a chain coupled to said first and second sprockets.

14. The vehicle of claim 1 wherein each of said front and rear wheels is approximately 12 inches in diameter.

* * * * *